(12) United States Patent
Klein et al.

(10) Patent No.: US 10,277,126 B2
(45) Date of Patent: Apr. 30, 2019

(54) SWITCHING ENERGY CONVERTER WITH REDUCTION OF THE STATIC BIAS INTRODUCED BY A STABILIZING RAMP

(71) Applicant: THALES, Courbevoie (FR)

(72) Inventors: François Klein, Valence (FR); Christophe Taurand, Valence (FR)

(73) Assignee: THALES, Courbevoie (FR)

( * ) Notice: Subject to any disclaimer, the term of this patent is extended or adjusted under 35 U.S.C. 154(b) by 5 days.

(21) Appl. No.: 15/624,223

(22) Filed: Jun. 15, 2017

(65) Prior Publication Data

US 2017/0366085 A1    Dec. 21, 2017

(30) Foreign Application Priority Data

Jun. 21, 2016 (FR) ...................... 16 00990

(51) Int. Cl.
*H02M 3/157* (2006.01)
*H02M 1/08* (2006.01)
*H02M 3/156* (2006.01)
*H02M 3/335* (2006.01)
*H02M 1/00* (2006.01)

(52) U.S. Cl.
CPC ............. *H02M 3/157* (2013.01); *H02M 1/08* (2013.01); *H02M 3/156* (2013.01); *H02M 3/33507* (2013.01); *H02M 2001/0009* (2013.01); *H02M 2001/0025* (2013.01)

(58) Field of Classification Search
CPC . H02M 3/157; H02M 1/08; H02M 2001/0009
See application file for complete search history.

(56) References Cited

U.S. PATENT DOCUMENTS

| 4,975,820 | A | 12/1990 | Szepesi | |
|---|---|---|---|---|
| 9,178,415 | B1* | 11/2015 | Kost | H02M 3/157 |
| 2004/0178783 | A1* | 9/2004 | Uematsu | H02M 3/157 |
| | | | | 323/282 |
| 2006/0043951 | A1 | 3/2006 | Oswald et al. | |
| 2007/0013355 | A1 | 1/2007 | Liao | |
| 2009/0309557 | A1 | 12/2009 | Miyamae | |

(Continued)

OTHER PUBLICATIONS

Search Report and Written Opinion for FR 1600990 dated Jun. 21, 2016.

*Primary Examiner* — Jue Zhang
*Assistant Examiner* — Lakaisha Jackson
(74) *Attorney, Agent, or Firm* — Pearne & Gordon LLP

(57) ABSTRACT

This converter includes a controllable switch (M) and a control device (311) for generating a signal for controlling the opening and closing instants of the switching switch, the control device being of the control device type in a current mode requiring the application of a current stabilization signal. The control device includes a component (20) delivering a stabilization signal (RC) intermittently, by applying the stabilization signal (RC) at a predetermined instant which precedes a reference instant; and a comparator (28) for generating a control signal (CM) of the controllable switch (M) from the comparison of a set value signal (ÎL) and of a measurement signal corresponding to the current (IL) flowing in an impedance (L) of the converter, the intermittent stabilization signal (RC) being subtracted from the set value signal (ÎL) or added to the measurement signal before applying the comparator.

8 Claims, 10 Drawing Sheets

(56) References Cited

U.S. PATENT DOCUMENTS

| | | | |
|---|---|---|---|
| 2015/0003119 A1* | 1/2015 | Li | H02M 3/33507 363/21.13 |
| 2015/0244262 A1* | 8/2015 | Ouyang | H02M 3/158 323/283 |
| 2017/0201174 A1* | 7/2017 | Li | H02M 3/157 |

* cited by examiner

SWITCHING ENERGY CONVERTER WITH REDUCTION OF THE STATIC BIAS INTRODUCED BY A STABILIZING RAMP

The present invention relates to switching energy converters.

The invention is more particularly related to the switching energy converters with control in a peak current mode or in a charge control mode.

A switching energy converter is based on the switching of switchable switch(s), which applies a chopped voltage to a filtering circuit consisting of inductive and capacitive components. The control of the opening and closing instance of said or each switch gives the possibility, by interaction with the load connected on the output of the converter, of generating a voltage and/or a more or less large current at the output of the converter.

FIG. 1 illustrates a converter 10 in a non-insulated lowering topology "Buck" with passive rectification. The controllable switch is, in this case, a switching member with a controllable semiconductor of the N-MOS transistor type (as illustrated in the figures or alternatively P-MOS transistor type) mounted between the input voltage Vin and the inductance L.

It is by varying the control of the transistor M, by varying its duty cycle, that the current is adjusted in the inductance L and therefore the output voltage Vout on the terminals of an output capacitor Cout. The fact that the rectification is passive, i.e. produced by a diode D instead of another transistor, makes the converter 10 unidirectional, preventing negative currents in the inductance L and making possible the operation with discontinuous conduction. Finally, the "Buck" topology is naturally a lowering technology, the output voltage Vout being less than the input voltage Vin.

The operating phases of the converter 10, for continuous conduction (i.e. for a load connected to the output which is sufficiently large, so that the current IL does not cancel out) are illustrated in FIG. 2 for the voltage VL on the terminals of the inductance L and in FIG. 3 for the current IL through the inductance L:

Phase "ON": the transistor M is closed and conducts the current. The voltage VL applied to the inductance L is positive (Vin−Vout) and the current IL in the latter increases.

Phase "OFF": the transistor M is open. The current IL being positive in the inductance L, causes conduction of the diode D. The applied voltage VL to the inductance L is then negative (−Vout) and the current IL in the latter decreases.

By considering that the conditions are established, the current at the beginning of the "ON" phase is equal to the current at the end of the "OFF" phase and the phases "ON" and "OFF" follow periodically.

There exist various ways of controlling a converter, such as the converter 10 of FIG. 1, i.e. of determining at which instant closure is ordered and at which instant opening of the transistor M is ordered.

In particular, the control in the current mode is known.

The converter thus includes a control device giving the possibility of generating a signal for controlling the transistor M. The control device includes an error corrector on the output voltage Vout relatively to a reference voltage Vcons. The output signal of the error corrector does not directly control the transistor M, but forms a set value signal for a current control loop.

The current loop gives the possibility of subordination the measured current which flows in the transistor on the set value signal stemming from the error corrector may be achieved in different ways:

In a control in a peak current mode, illustrated in FIG. 4, the control device 111 of the converter 110 gives the possibility of subordinating the peak value of the current IL in the transistor M and the inductance L on the set value signal $\widehat{IL}$ delivered by the error corrector 12. This solution is the most widespread since it is the most simple to achieve. The opening of the transistor M is triggered at the end of the comparison, by the comparator 14, of the set value signal $\widehat{IL}$ and of the measurement of the current. The signal at the output of the comparator 14 is applied on the inverted input of a flip-flop 18 controlled by a clock signal CLK, which gives the possibility of putting the output Q of the flip-flop 18 into the high state "1" at each rising edge of the clock signal CLK. The output Q is then switched into the low state "0" when the signal at the output of the comparator 14 is in the low state "0". The signal at the output of the flip-flop is the signal for controlling the transistor M. Further, this solution gives the possibility of achieving a limitation of the current, cycle per cycle, and therefore of protecting the circuit against the saturation of the inductance L. This is therefore more robust.

In a control in an integrated current mode, also called a charge control mode, illustrated in FIG. 5, the control device 211 of the converter 210 achieves the time integration, by means of a time integrator 16, from the measurement ILmes of the current IL in the transistor M. The measurement signal Qmes delivered at the output of the component 16 and applied on one of the inputs of the component 14 here corresponds to the input load of the converter 2. The time integrator 16 is reset to zero at each switching period, by the clock signal CLK which also circulates the switching by the flip-flop 18. The current IL is subordinated to the set value signal delivered by the error corrector 12. This kit notably gives the possibility of having a real limitation of the current, independently of the voltages and of the duty cycles set into play.

During the control of the transistor M with control devices in the peak current mode or in the integrated current mode, sub harmonic instabilities of the current may appear.

Thus, for example, in the circuits "control in the peak current mode" if an error $\varepsilon_{IL\_0}$ of reading the current IL is introduced to an initial switching period, this will cause premature opening of the transistor M, since the set current value $\widehat{IL}$ will be attained more rapidly ($IL_{reel}$) then theoretically ($IL_{theoretical}$).

FIG. 6 shows the time dependent change in this error during the switching cycles when the theoretical duty cycle α of the control signal CM of the transistor M is less than ½. In this case, the error $\varepsilon_{IL}$ will naturally tend to dampen and disappear during the switching: $\varepsilon_{IL\_0} > \varepsilon_{IL\_1} > \varepsilon_{IL\_2} > \varepsilon_{IL\_3} > \varepsilon_{IL\_4} > \varepsilon_{IL\_5}$.

On the other hand, as this is illustrated FIG. 7, when the theoretical duty cycle α of the control signal CM of the transistor M is greater than ½, the error $\varepsilon_{IL}$, governed by a geometrical series, amplifies, reaching a point such that the current set value $\widehat{IL}$ is no longer valid in a switching cycle. This causes irregularities during which the duty cyclic of the control of the transistor M oscillates, showing a repeated pattern in one cycle out of two or in one cycle out of three. This is referred to as sub-harmonic instability.

In order to stabilize the sub-harmonic instability, the state of the art consists of using a stabilization ramp, which may be known under the name of a compensation ramp: it is either added to the measurement signal associated with the current IL, or subtracted from the set value signal $\tilde{IL}$. This is an increasing signal, which may be linear, affine or parabolic, which is reset to zero at each instant of the beginning of a cycle. The efficiency of the stabilization depends on the time derivative of the ramp at the instant when it attains the current set value, i.e. at the instant when the transistor is open. FIG. 8 shows the time dependent change in the current error $\varepsilon_{IL}$ with a stabilisation ramp which is subtracted from the set value signal $\tilde{IL}$. The principle remains the same when the stabilization ramp is added to the measurement signal, ILmes or Qmes, associated with the current IL. This is generally what is physically achieved for reasons of ease of implementation.

It will be noted that there exist particular values of the slope of the stabilization ramp, i.e., always for the case of a "Buck" converter:

With a ramp having for a slope of $$\frac{Vout}{L},$$

the error will be cancelled in one cycle;
With a ramp having a slope of $$\alpha = \frac{Vout}{Vin}$$

the converter will be theoretically insensitive to the variations of the input voltage for a set value signal. This is interesting for audio-sensitivity.

Unfortunately, the stabilisation ramp as used in the state of the art is as described above and has drawbacks.

Indeed, as this may be seen in FIG. 8, the actually attained peak current is not the set value current $\tilde{IL}$, but a lower value, since the stabilization ramp RC has been subtracted there from. This difference may be detrimental, notably in the case of a converter having a variable input voltage. In this case, not only the theoretical duty cycle for controlling the transistor $$\frac{Vout}{Z \times L},$$

changes, but also the slope of the current. This result of this is a significant variation of the peak current for a same set value.

This is all the more true since we operate at a high duty cycle.

This is detrimental in the whole of the converters since the uncertainty on the current limitation requires taking into account a significant margin towards saturation currents of the inductive components. This results in an over-dimensioning of these components. Further, this difference is also bothersome for converters for which the current limitations needs accuracy, like for example the converters connected to the electric networks of an airplane, for which there are requirements on the starting current.

The object of this invention is to find a remedy to this problem.

For this, the object of the invention is a switching energy converter, including a controllable switch and a control device for generating a control signal for the opening and closing instance of the switching switch, said control device being of the control device in a current mode requiring the application of a current stabilization signal. This control device includes:

A component delivering a stabilization signal intermittently, by applying said stabilization signal at a predetermined instant which precedes a reference instant, and, A means for comparing the generation of a control signal of the controllable switch from the comparison of a set value signal and from a measurement signal corresponding to the current circulating in an impedance of the converter, the intermittent stabilization signal being subtracted from the set value signal or added to the measurement signal before applying the comparison means.

According to particular embodiments, the converter includes one or several of the following features, taken individually or according to all the technically possible combinations:

The comparison means includes a comparator and a flip-flop, an output of the comparator being connected to an input of the flip-flop, the signal delivered on an output of the flip-flop corresponding to the control signal;

The component applies the stabilisation signal when the duty cycle of the operation of the controlled switch is greater than ½;

The component applies the stabilisation signal at a determined instant dynamically from the input voltage and/or the output voltage;

The component applies the stabilization signal at a determined instant from an instant of opening of the controlled switch during a switching period which precedes the current switching period;

The control device further includes a summation means for adding an average value of the stabilization signal to the set value current before applying to the comparator;

The converter has a topology selected from among a "Buck" topology, a "Boost" topology, a "Buck-Boost" topology, a "non-inverter Buck-Boost" topology, a "Fly back" topology and a "Forward" topology;

The current mode of the control device is a peak current mode, the measurement signal then being a measurement of an instantaneous current flowing through the inductance, or an integrated current mode, the measurement signal then resulting from a measurement of an instantaneous load flowing through the inductance;

The controlled switch is a transistor.

The invention and its advantages will be better understood upon reading the detailed description which follows of a particular embodiment, only given as a non-limiting example, this description being made with reference to the appended drawings wherein.

Figure 9:
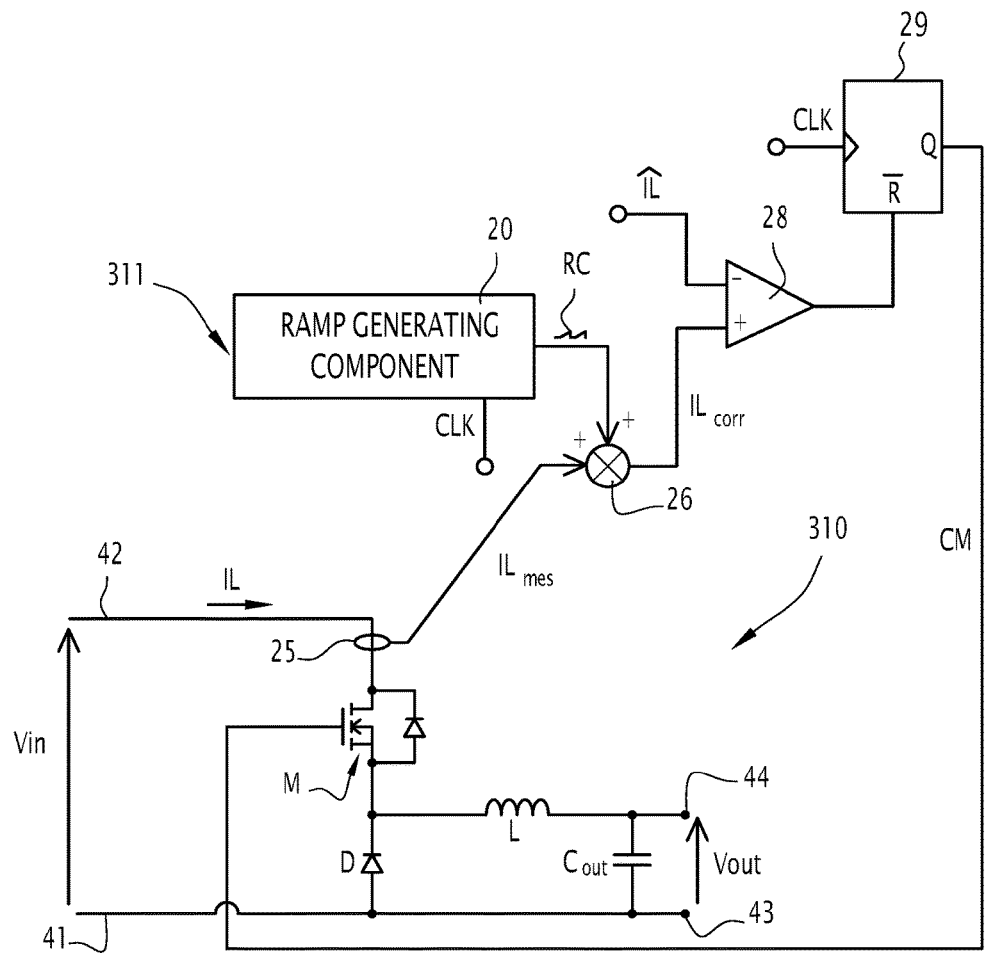
FIG. 9 is another known embodiment of a converter.
Figure 11:
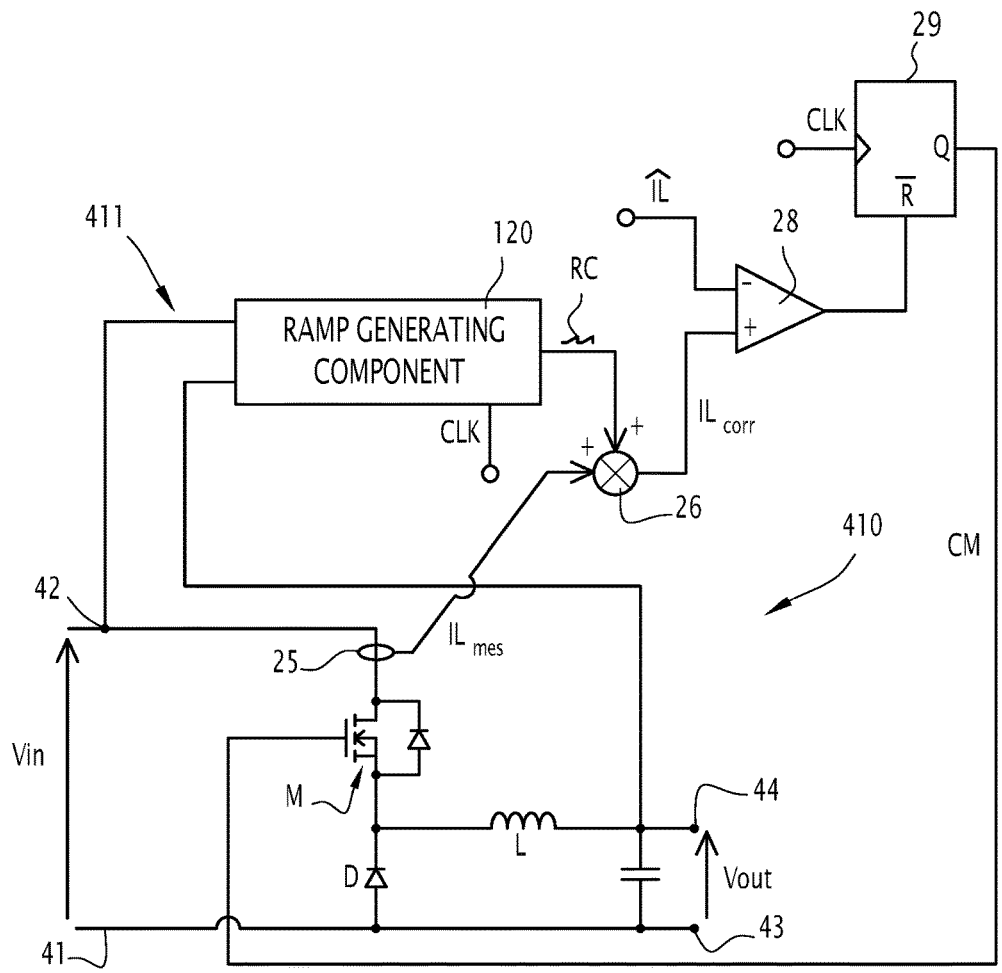
Figure 12:
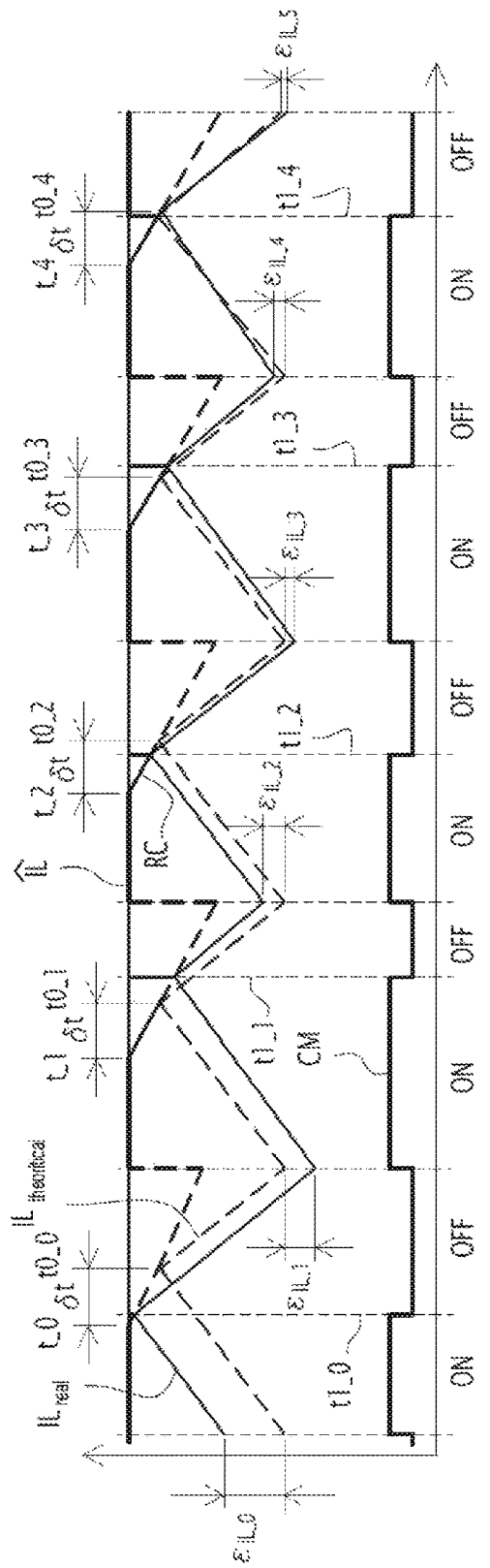
Figure 13:
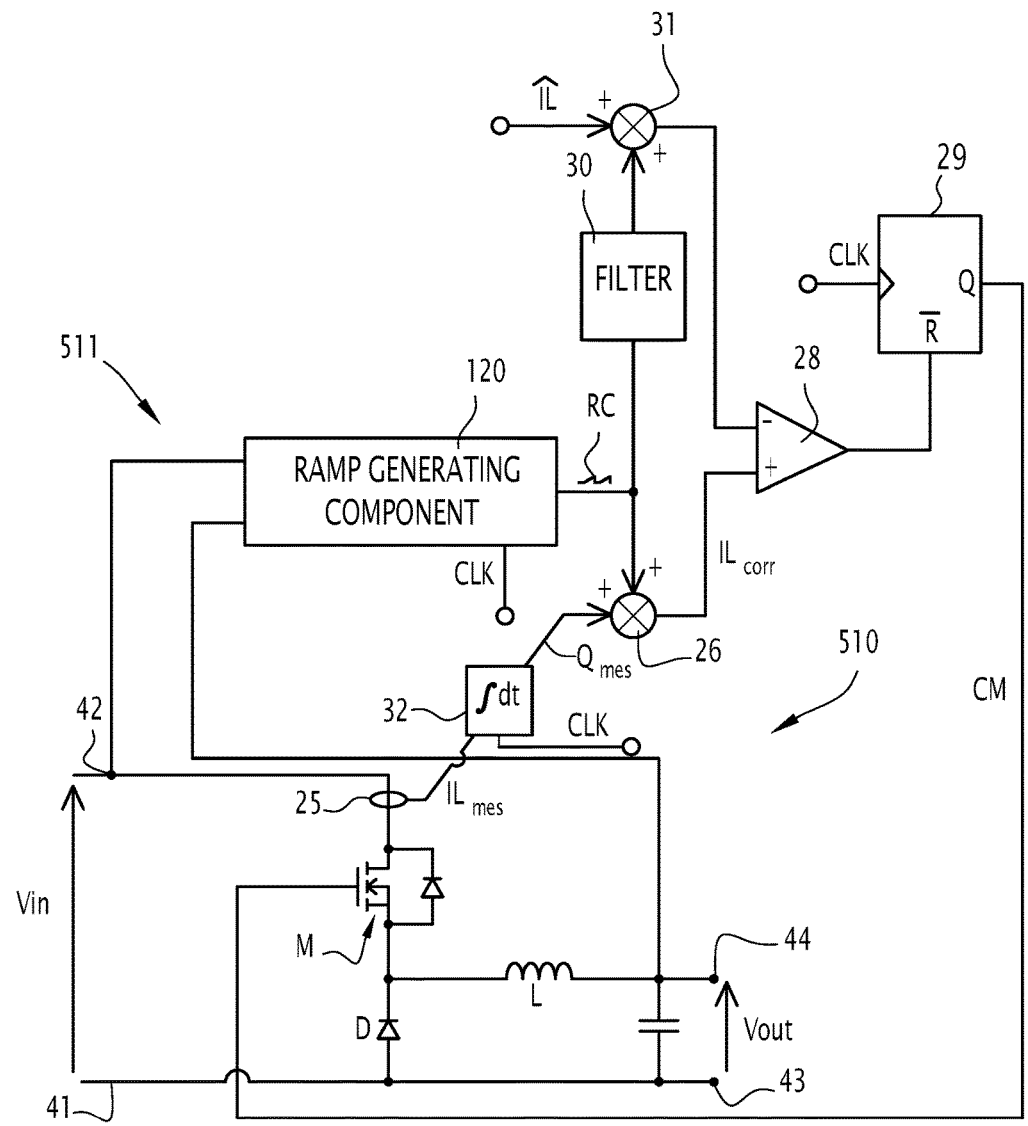
Figure 14:
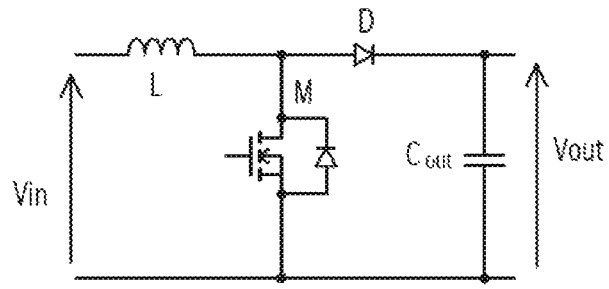
Figure 15:
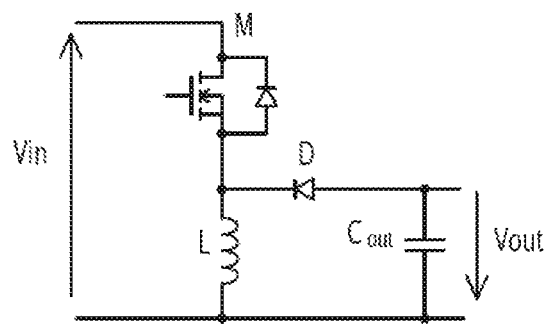
Figure 16:
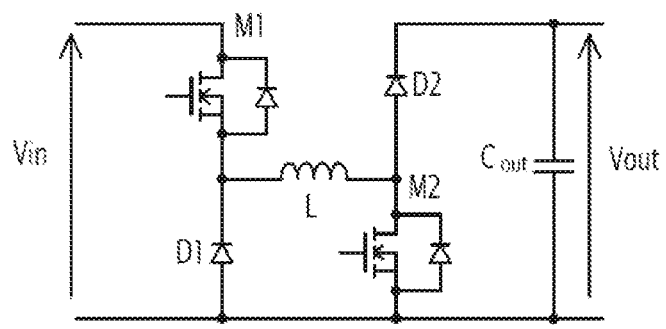
Figure 17:
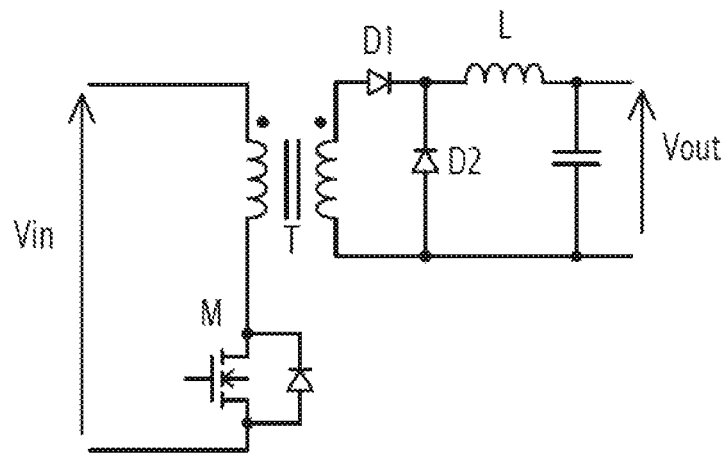
Figure 18:
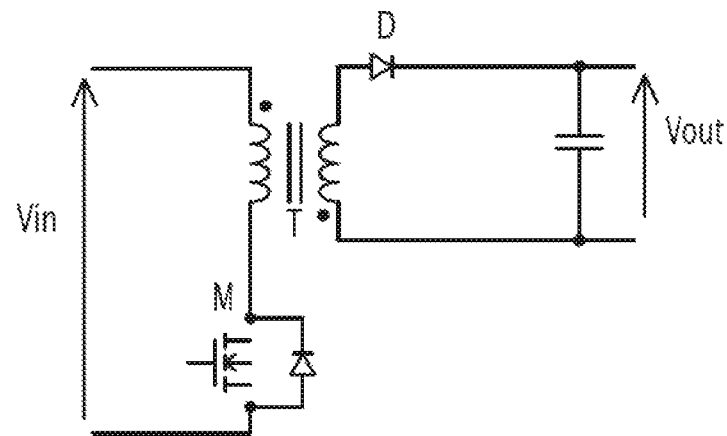

FIG. 10 approximately represents the time-dependent changing curves of the real current $IL_{real}$, of the theoretical current $IL_{theoretical}$, of the set value current $\hat{IL}$, and of the signal for controlling the transistor M for the converter of FIG. 9;

FIG. 11 is another known embodiment of a converter;

FIG. 12 approximately represents the time-dependent changing curves of the real current $IL_{real}$, of the theoretical current $IL_{theoretical}$, of the set value current $\hat{IL}$, and of the signal for controlling the transistor M for the converter of FIG. 11;

FIG. 13 is a preferred embodiment of a converter according to the invention; and, FIGS. 14 to 18 represent other topologies for a converter for which said or each switching member may be controlled by applying the present invention.

Figure 1:
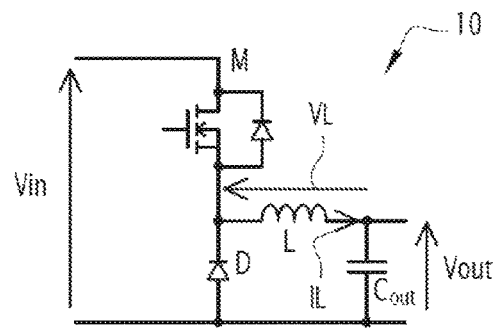
FIG. 1 is an electronic diagram of a converter in "Buck" topology.
Figure 2:
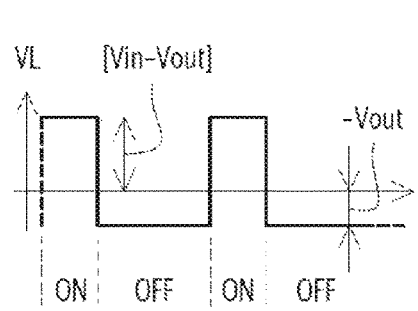
FIGS. 2 and 3 are curves representing the time-dependent change in the voltage and the current on the terminals of the inductance of the converter of FIG. 1.
Figure 3:
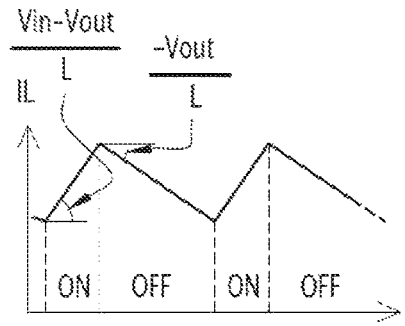
Figure 4:
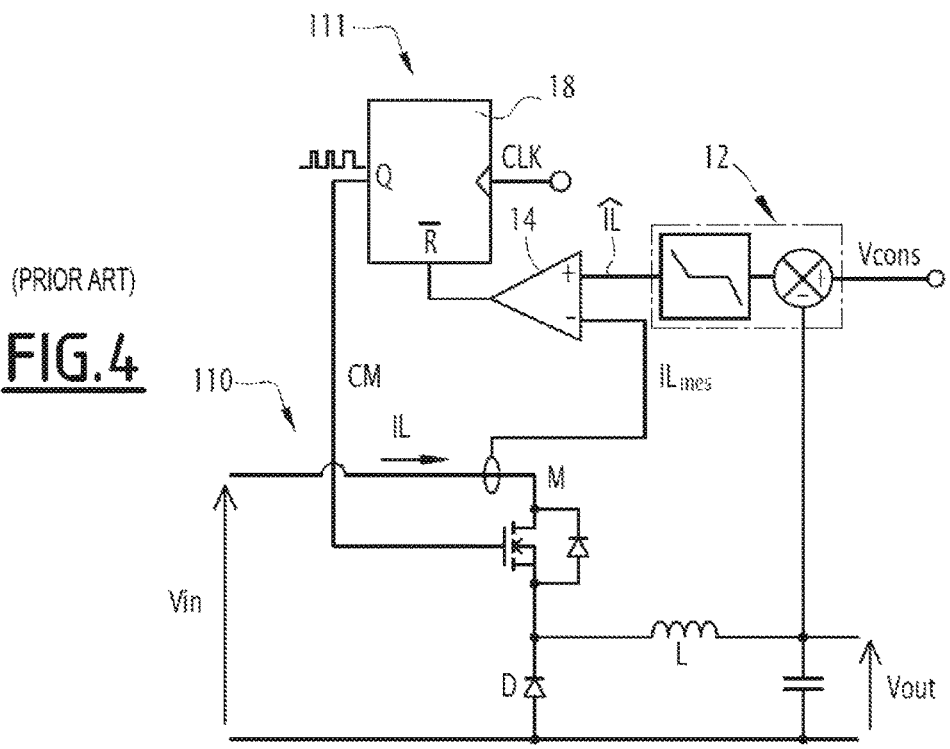
FIGS. 4 and 5 represent two known ways for controlling the converter of FIG. 1.
Figure 5:
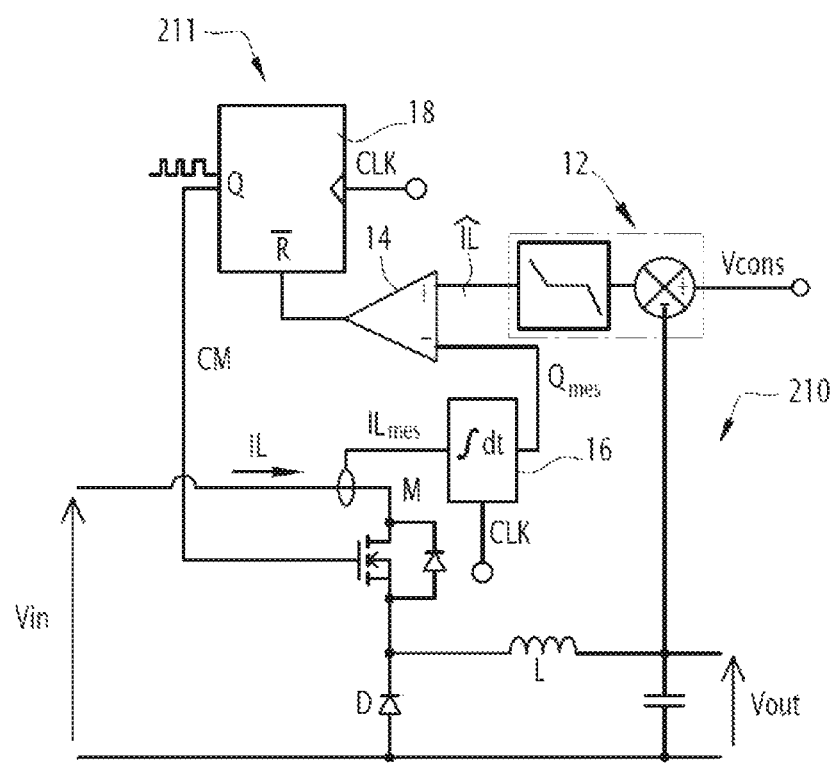
Figure 6:
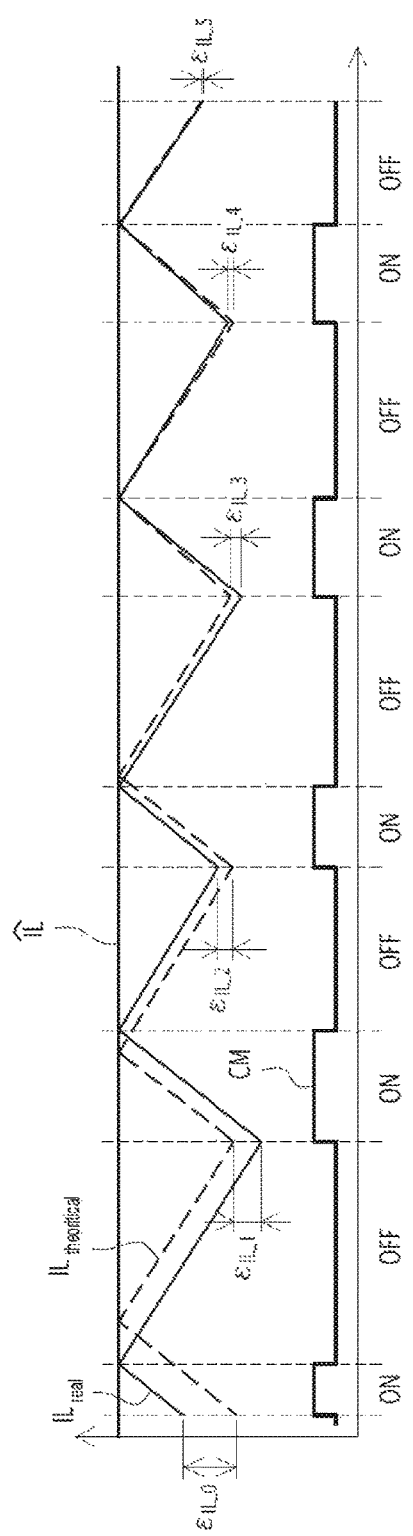
FIGS. 6 and 7 are approximate curves illustrating the time-dependent change of a current error in the converter of FIG. 4.
Figure 7:
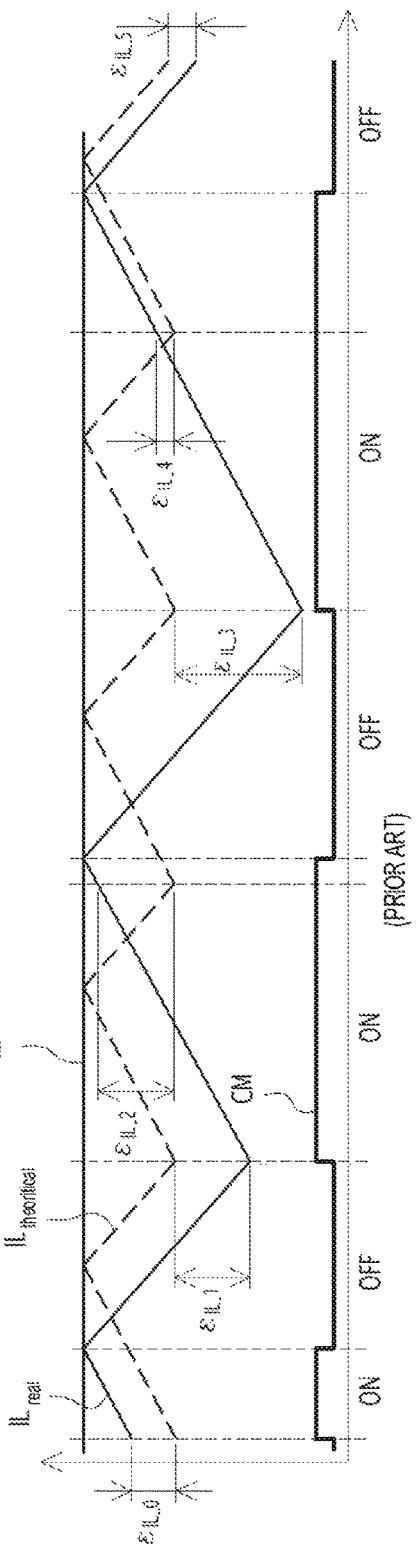
Figure 8:
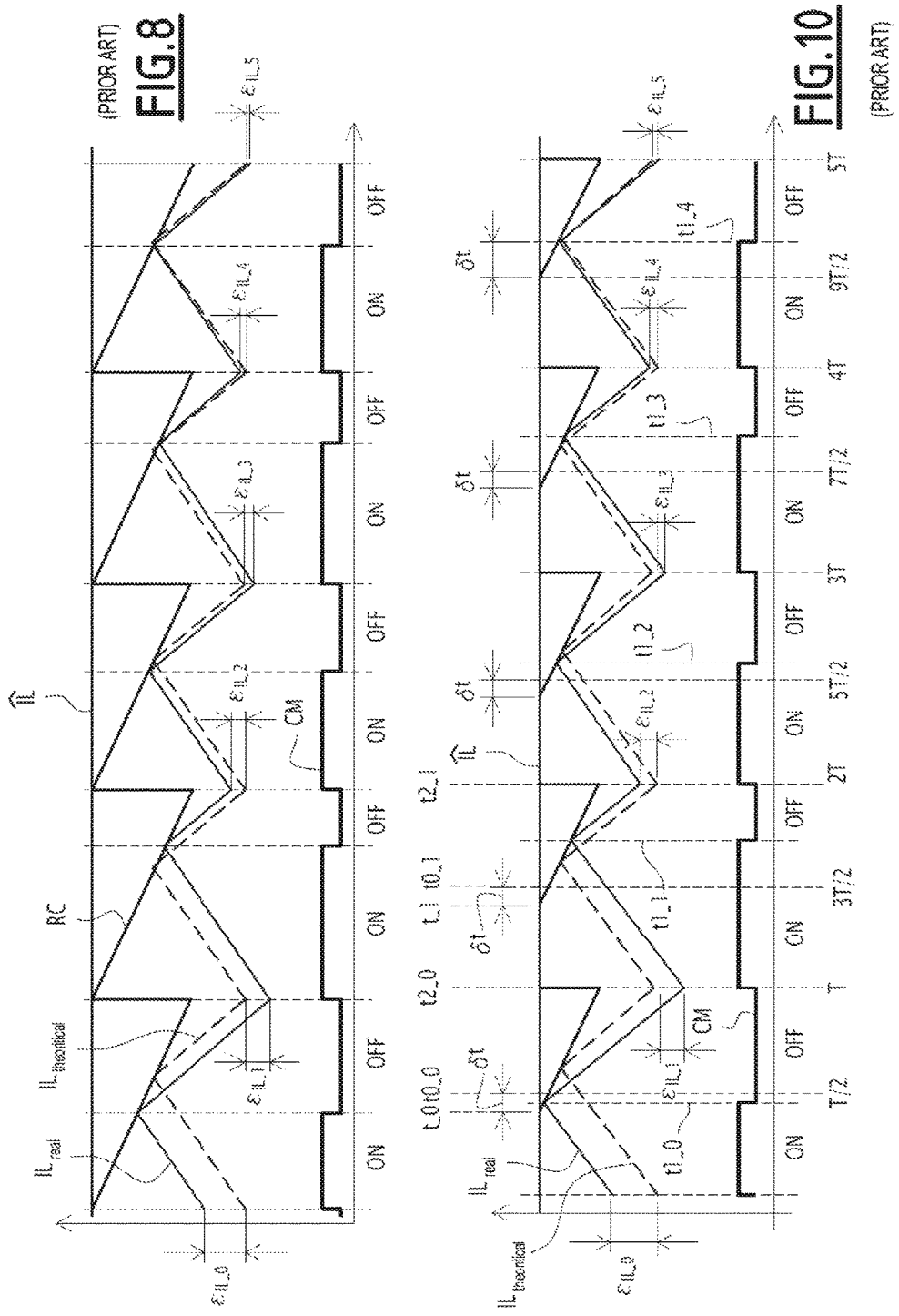
FIG. 8 is a known alternative embodiment wherein the current error is compensated by applying a stabilization ramp.

The converter 310 of FIG. 9 is a converter in "Buck" topology similar to that of FIG. 1.

It converts an input voltage Vin applied between two input terminals, 41 and 42 into an output voltage Vout delivered between two output terminals, 43 and 44.

It includes a transistor M, a diode D and an inductance L and an output capacitor Cout.

The control device 311 of the converter 310 includes:

a component 20, able to generate an RC intermittent stabilization ramp by determining in a fixed way the instant of application of a stabilization ramp;

A sensor 25, for example a Hall effect sensor, able to deliver, as a measurement signal, a measured current ILmes corresponding to the instantaneous current IL crossing the inductance L and the transistor M;

A summer 26, able to sum the RC intermittent stabilization ramp at the output of the controlled switch 24 and the measured current ILmes so as to generate at the output a corrected current ILcorr;

A comparator 28, on an input of which is applied the corrected current, and on the other input of which is applied a set value signal $\hat{IL}$, which is a current here.

The output signal of the comparator 28 generates the signal for controlling the triggering of the opening of the transistor, by controlling the reset of a flip-flop 29.

The flip-flop 29 is able to rate the switching. The clock signal CLK gives the possibility of placing the output signal Q of the flip-flop 19 in the high state "1" at each rising edge, the switching thereby starting at each rising edge of the clock signal. The signal at the output of the comparator 28 is applied on the inverted input of the flip-flop 19 so as to switch the output signal Q into the low state "0" when the output signal of the comparator 28 is in the low state "0". The output signal Q of the flip-flop 19 is the control signal CM of the state of the transistor M, which is applied to the gate of the transistor M in order to alternatively control the opening and the closing.

The comparator 28 and the flip-flop 29 are a comparison means. One skilled in the art is aware of other ways to apply the logic comparison function which has just been described.

It will be noted that in this embodiment, the RC intermittent stabilization ramp is added to the measurement signal. Alternatively, it is subtracted from the set value signal $\hat{IL}$.

The control device 311 gives the possibility of reducing the impact of a continuous application of a stabilization ramp on the accuracy of the current control.

The control device 311 applies the stabilization ramp when its theoretical application is required, i.e. for duty cycles greater than ½. For this, the component 20 applies the stabilization ramp at an instant t which precedes a reference instant t0 corresponding to the half switching period T/2, with a predetermined margin δt.

The component 20 stops the application of the stabilization ramp at an instant t2 of the end of the switching period T, i.e. at the instant of the closing of the transistor M.

This is why it is stated that the stabilization ramp delivered by the component 20 is intermittent.

This principle is illustrated in FIG. 10. In this figure, for the operating cycle i, the error on the current is noted as $\varepsilon_{IL\_i}$; the reference instant, $t0_{\_i}$; the instant for triggering the application of the stabilization ramp, $t_{\_i}$; the effective opening instant of the transistor, $t1_{\_i}$; and the instant of end of application of the ramp, $t2_{\_i}$.

It should be noted that the control device 311 applies the ramp from ½-δt: If the transistor is still closed at this moment, this means that the duty cycle is greater than a ½, and the ramp will have an impact; If on the other hand the transistor is already open at this moment, this means that the duty cycle is less than a ½, and the ramp will then have no impact (this is required, since such a ramp is not necessary in this case for stabilizing the current error).

Consequently, the shift between the current set value $\hat{IL}$ and the real current IL is reduced relatively to the solution of the state of the art consisting of applying the stabilization ramp as soon as the beginning of the cycle.

In a second embodiment, illustrated in FIG. 11, the converter 410 is essentially similar to that 310 of FIG. 1. The components of FIG. 11 identical with those of FIG. 9 bear the same reference numbers.

The converter 410 differs from the converter 310 in that the component 120 for application by intermittence of the stabilization ramp determines in an adaptive way the instant of application of the stabilization ramp according to the input voltages Vin and/or output voltages Vout.

It should be noted that in the case of a converter with a set output voltage Vout, as described in detail below, the duty cycle only varies because of the variation of the input voltage Vin. Accordingly, the instant for applying the stabilization ramp is only dependent on the input voltage Vin; but, in the more general case when the output voltage Vout is variable, it is necessary to take this voltage also into account in order to estimate the theoretical duty cycle, i.e. the instant for applying the stabilization ramp.

The control device 411 applies the stabilization ramp only at the moment when it is needed. For this, the theoretical duty cycle is estimated from the input voltage Vin of the converter 410.

The component 120 applies the stabilization ramp at an instant t which precedes, with a predetermined margin δt, a corresponding reference instant t0, in the present embodiment, at the instant of theoretical opening of the transistor M.

The component 120 stops the application of the stabilization ramp RC at the instant of effective opening t1, of the transistor M. Alternatively, the component 120 is switched into the open state for stopping the application of the stabilization ramp at instant t2 of the end of the switching period T, i.e. at the instant for closing the transistor M (this alternative is illustrated in dotted lines in FIG. 12).

This principle is illustrated in FIG. 12. In this figure, for the operating cycle i, the error on the current is noted as $\varepsilon_{IL\_i}$, the reference instant $t0_{\_i}$, the instant for triggering the stabilization ramp $t_{\_i}$, the effective opening instant $t1_{\_i}$ and the instant of the end of period $t2_{\_i}$.

Consequently, the shift between the current set value $\widetilde{IL}$ and the real current IL is reduced, and this all the more as the margin $\delta t$ is selected to be small.

The control device 411 gives the possibility of reducing the impact of a continuous application of the stabilization ramp on the accuracy of the current control.

The theoretical duty cycle may be estimated in the following way: for a converter with a constant output voltage Vout, the reference instant t0 for theoretical opening of the transistor M may easily be estimated, since it depends on the reciprocal of the input voltage Vin. It is therefore possible to use a simple voltage divider on the input voltage, for example achieved by comparing a fixed quantity with a ramp for which the slope is proportional to the input voltage; this will result in a pulsed width modulated signal for which the average value is proportional to the reciprocal of the input voltage. From this quantity proportional to the reciprocal of the input voltage, the instant t for applying the ramp t0−δt is generated.

Another mode of implementation consists not in estimating the theoretical duty cycle, but by using as a basis the duty cycle of the preceding switching period. A circuit will store in memory the instant of opening of the transistor M of the preceding period; by subtracting the selected margin δt therefrom, it thereby determines the instant for applying the ramp for the current period.

In a third embodiment, corresponding to the invention, illustrated in FIG. 13, the control device 511 of the converter 510, always with a "Buck" lowering topology, is a control device in the integrated current mode. The components of FIG. 13 are identical with those of FIGS. 9 and 11 when they bear the same reference numbers.

The control device 511 thereby includes an integrator 32 able to integrate overtime the measurement of the current delivered by the sensor 25, in order to obtain a set value signal Qmes (homogeneous to an electric charge). The integrator 32 is re-set at each switching period by the clock signal CLK which is also used for the components 120 and 29. The measurement signal Qmes is applied at the input of the comparator 28, after adding the intermittent stabilization ramp RC.

The control device 511 further includes:

A filter 30 taking as an input the output signal of the controlled switch 24, i.e. the RC intermittent stabilization signal and determines the average value therefrom;

a summer 31 giving the possibility of adding to the current set value $\widetilde{IL}$, this average value of the intermittent RC stabilization ramp, before applying it at the input of the comparator 28.

The fact of adding the average value and not the instantaneous value does not cancel the effect of the stabilization ramp. But with this control device, there is no longer any shift between the current set value $\widetilde{IL}$ and the real current ILreal. Indeed, the bias introduced in the current measurement through an increase in the current set value will be compensated. Thus the impact of the ramp on the inaccuracy of the control is compensated and canceled out.

The degradation of the accuracy of the control in a current mode, caused by the introduction of a stabilization ramp, is entirely canceled out and the overall accuracy of the current loop of the control device in the circuit according to this third embodiment is greatly improved. If both first embodiments give the possibility of attenuating the inaccuracy introduced by the ramp, the third embodiment totally compensates for the inaccuracy of the ramp through the addition of its average value to the set value.

The present invention has been described in detail for the case of a converter in "Buck" topology, but one skilled in the art will understand that the control principle shown is also valid for non-isolated converters in "Boost", "Buck-Boost" and "non-inverter Buck-Boost" topology or isolated converters in the "Forward" and "Flyback" topology, as represented in FIGS. 14, 15, 16, 17 and 18 respectively. It operates for controls of the peak current mode type and integrated current mode type (i.e. the charge control mode).

Finally, the whole of the cases shown illustrates converters with passive rectification, and the control principle is also valid for converters with active rectification, also called synchronous rectification, the switching diodes being replaced with controllable switches.

The invention claimed is:

1. A switching energy converter, including:
   a controllable switch and a control device for generating a control signal for controlling opening and closing instants of the controllable switch, the control device being a control device of type in current mode comprising a current loop to control a measurement signal to a set value signal, the measurement signal corresponding to an instantaneous current flowing in an impedance of the switching energy converter,
   the control device including:
   a means for delivering the measurement signal;
   a component delivering a stabilization ramp intermittently, and applying said stabilization ramp at a predetermined instant which precedes a reference instant in order to stabilize subharmonic instabilities in the current loop; and,
   a comparing unit for generating the control signal of the controllable switch from the comparison between the set value signal and the measurement signal, the intermittent stabilization ramp being subtracted from the set value signal or added to the measurement signal before application to the comparing unit,
   wherein the control device further includes a summation unit for adding an average value of the stabilization ramp to the set value signal before application to the comparing unit.

2. The switching energy converter according to claim 1, wherein the comparing unit includes a comparator and a flip-flop, an output of the comparator being connected to an input of the flip-flop, the signal delivered on an output of the flip-flop corresponding to the control signal.

3. The switching energy converter according to claim 2, wherein the component applies the stabilization ramp at an instant that is dynamically determined based on an input voltage and/or an output voltage.

4. The switching energy converter according to claim 2, wherein the component applies the stabilization ramp at an instant that is determined based on an instant of opening of the controllable switch during a switching period which precedes a current switching period.

5. The switching energy converter according to claim 1, the switching energy converter having a topology selected from among a "Buck" topology, a "Boost" topology, a "Buck-Boost" topology, a "non-inverter Buck-Boost" topology, a "Fly back" topology and a "Forward" topology.

6. The switching energy converter according to claim 1, wherein the current mode of the control device is a peak current mode, the measurement signal being a measurement of an instantaneous current flowing through the inductance, or an integrated current mode, the measurement signal being a measurement of an instantaneous charge flowing through the inductance.

7. The switching energy converter according to claim 1, wherein the controllable switch is a transistor.

8. The switching energy converter according to claim 1, wherein the stabilization ramp is an increasing signal, which is reset to zero at each instant of the beginning of a cycle.

* * * * *